(12) United States Patent
Henschel et al.

(10) Patent No.: US 12,496,124 B2
(45) Date of Patent: *Dec. 16, 2025

(54) METHOD FOR APPLYING CONDUCTORS TO CATHETER BASED BALLOONS

(71) Applicant: Medtronic CryoCath LP, Toronto (CA)

(72) Inventors: Mark E. Henschel, Phoenix, AZ (US); Brian T. Howard, Minneapolis, MN (US); Timothy G. Laske, Shoreview, MN (US); Kenneth C. Gardeski, Inverness, FL (US); Gonzalo Martinez, Mendota Heights, MN (US); Mark T. Stewart, Lino Lakes, MN (US); Lars M. Mattison, St. Anthony, MN (US)

(73) Assignee: Medtronic CryoCath LP, Toronto (CA)

( * ) Notice: Subject to any disclaimer, the term of this patent is extended or adjusted under 35 U.S.C. 154(b) by 950 days.

This patent is subject to a terminal disclaimer.

(21) Appl. No.: 17/475,636

(22) Filed: Sep. 15, 2021

(65) Prior Publication Data

US 2022/0000550 A1 Jan. 6, 2022

Related U.S. Application Data

(63) Continuation-in-part of application No. 15/896,228, filed on Feb. 14, 2018, now abandoned.
(Continued)

(51) Int. Cl.
*A61B 18/14* (2006.01)
*A61B 18/00* (2006.01)
(Continued)

(52) U.S. Cl.
CPC ...... *A61B 18/1492* (2013.01); *A61B 18/1206* (2013.01); *A61B 2018/00071* (2013.01);
(Continued)

(58) Field of Classification Search
CPC ............ A61B 18/1492; A61B 18/1206; A61B 18/082; A61B 18/14; A61B 18/1402;
(Continued)

(56) References Cited

U.S. PATENT DOCUMENTS

| 4,411,648 A | 10/1983 | Davis et al. |
| 5,662,108 A | 9/1997 | Budd et al. |

(Continued)

OTHER PUBLICATIONS

Dae-Hyeong Kim, et al., Materials for Multifunctional Balloon Catheters with Capabilities in Cardiac Electrophysiological Mapping and Ablation Therapy, Nature Materials, vol. 10, Apr. 2011, 9 pages.

(Continued)

*Primary Examiner* — Joseph A Stoklosa
*Assistant Examiner* — Ana Veruska Guerrero
(74) *Attorney, Agent, or Firm* — Michael Best & Friedrich LLP (57) ABSTRACT

The present invention advantageously provides a molding device with conductive material for creating a catheter balloon with conductive elements, and methods and systems for manufacturing the catheter balloon with conductive elements. An exemplary method for coupling a plurality of conductive elements to an expandable element may include placing a first portion of a mold proximate a second portion of the mold to define a casting cavity. Conductive material may be deposited into the casting cavity. Polymeric material may be inserted into the casting cavity. The first portion of the mold may be secured to the second portion of the mold. The polymeric material may be expanded to place the polymeric material in contact with the conductive material.

6 Claims, 9 Drawing Sheets

Related U.S. Application Data (60) Provisional application No. 63/162,596, filed on Mar. 18, 2021, provisional application No. 62/460,317, filed on Feb. 17, 2017.

(51) Int. Cl.
*A61B 18/12* (2006.01)
*A61B 18/08* (2006.01)

(52) U.S. Cl.
CPC ............ *A61B 2018/00077* (2013.01); *A61B 2018/00083* (2013.01); *A61B 2018/00214* (2013.01); *A61B 2018/0022* (2013.01); *A61B 2018/00351* (2013.01); *A61B 2018/00577* (2013.01); *A61B 2018/00702* (2013.01); *A61B 2018/00779* (2013.01); *A61B 2018/00827* (2013.01); *A61B 2018/00839* (2013.01); *A61B 2018/00892* (2013.01); *A61B 2018/00964* (2013.01); *A61B 18/082* (2013.01); *A61B 2018/1246* (2013.01); *A61B 2018/126* (2013.01); *A61B 18/14* (2013.01); *A61B 18/1402* (2013.01); *A61B 2018/1405* (2013.01); *A61B 2018/1435* (2013.01); *A61B 2018/144* (2013.01)

(58) Field of Classification Search
CPC .......... A61B 2018/00071; A61B 2018/00077; A61B 2018/00083; A61B 2018/00214; A61B 2018/0022; A61B 2018/00351; A61B 2018/00577; A61B 2018/00702; A61B 2018/00779; A61B 2018/00827; A61B 2018/00839; A61B 2018/00892; A61B 2018/00964; A61B 2018/1246; A61B 2018/126; A61B 2018/1405; A61B 2018/1435; A61B 2018/144; A61B 2018/00613; A61B 2018/1467

See application file for complete search history.

(56) References Cited

U.S. PATENT DOCUMENTS

| | | |
|---|---|---|
| 6,939,309 B1 | 9/2005 | Beatty et al. |
| 2001/0007070 A1* | 7/2001 | Stewart .............. A61B 18/1492 606/41 |
| 2002/0188289 A1 | 12/2002 | Hedge |
| 2003/0018387 A1 | 1/2003 | Schuessler |
| 2003/0144658 A1 | 7/2003 | Schwartz et al. |
| 2007/0287994 A1* | 12/2007 | Patel ................. A61B 18/1492 606/41 |
| 2009/0324866 A1 | 12/2009 | Bocker et al. |
| 2014/0052118 A1* | 2/2014 | Laske ................... A61B 5/283 606/32 |
| 2015/0305800 A1 | 10/2015 | Trieu |
| 2018/0214202 A1* | 8/2018 | Howard ................. A61B 34/20 |
| 2019/0030328 A1* | 1/2019 | Stewart .............. A61B 18/1492 |
| 2020/0205890 A1 | 7/2020 | Harlev et al. |
| 2020/0229866 A1 | 7/2020 | Harlev et al. |

OTHER PUBLICATIONS

Stephen P. Lee, et al., Catheter-Based Systems With Integrated Stretchable Sensors and Conductors in Cardiac Electrophysiology, Proceedings of the IEEE, vol. 103, No. 4, Apr. 2015, 8 pages.

Paisey, John R., Passive Electrode Effect Reduces Defibrillation Threshold in Bi-Filament Middle Cardiac Vein Defibrillation, European Society of Cardiology, Europace (2006) 8, 113-117, doi: 10.1093/europace/euj034.

\* cited by examiner

METHOD FOR APPLYING CONDUCTORS TO CATHETER BASED BALLOONS

CROSS-REFERENCE TO RELATED APPLICATION

This application is a Continuation-in-Part of U.S. patent application Ser. No. 15/896,228, filed Feb. 14, 2018, entitled METHOD FOR APPLYING CONDUCTORS TO CATHETER BASED BALLOONS, and is related to and claims priority to U.S. Provisional Patent Application Ser. No. 63/162,596, filed Mar. 18, 2021, entitled PULSED FIELD ABLATION CATHETERS WITH ENHANCED FIELD SMART ELECTRODES, and is related to and claims priority to U.S. Provisional Patent Application Ser. No. 62/460,317, filed Feb. 17, 2017, entitled METHOD FOR APPLYING CONDUCTORS TO CATHETER BASED BALLOONS, the entirety of which is incorporated herein by reference.

STATEMENT REGARDING FEDERALLY SPONSORED RESEARCH OR DEVELOPMENT n/a

TECHNICAL FIELD

This disclosure relates to endovascular catheters, and in particular, a method and system for applying conductive elements on catheter based balloons for tissue sensing, ablation, and cryogenic ablation and pulsed electric field (PEF) ablation and the use of passive electrodes to extend the electric field.

BACKGROUND

Developing advanced surgical tools for minimally invasive procedures may help to reduce procedure time, improve results, and reduce the likelihood of patient injury or relapse. Balloon catheters represent a frequently used class of medical instrument for delivering different therapies and facilitating various diagnoses inside the body. The catheter balloon may be inflated within a vessel and create a continuous ring of conformal contact between the tissue and the balloon. Minimally invasive insertion within the body can be achieved with a balloon catheter into internal structures. The balloon catheter may be configured through inflation to match the size and shape requirements of a particular internal structure. Sometimes the balloon is inflated and deflated, at least partially, several times during a procedure. A balloon catheter may include metal electrodes, wires, and other conductive components, which may be arranged in a variety of different ways to deliver treatments and therapies to specific tissue as well as to evaluate the tissue. The integrated circuits, sensors, actuators, and other electrical components may be coupled with a balloon catheter and in contact with tissue to provide highly localized methods of detection and therapy.

However, the stable integration of electrical components on and/or within a medical device may be difficult. For example, the size, planar geometry, and/or mechanical properties of in the electronic components and/or the medical device may complicate attachment between the electronic components and the medical device and/or cause detachment or loosening of the electronic components from the medical device during navigation through the patient's body and/or during use. Electrical components that are part of a balloon catheter may flake off or delaminate from the balloon surface during routine use and in routine conditions, which may put the patient at risk of injury. Accordingly, it would be desirable to have a way to integrate the electrical components with the medical device so they are reliably coupled and capable of performing their intended functions.

With respect to pulsed electric field ("PEF") ablation or pulsed field ablation ("PFA") these are ablation modalities where high voltage pulses are delivered from one or more electrodes to cause electroporation of a target tissue. In a typical application, a catheter with a plurality of electrodes in communication with a PEF generator is advanced to a location proximate the tissue to be ablated. High voltage pulses are delivered in a bipolar or monopolar manner which causes the creation of an electric field which electroporates the target tissue. However, the size and shape of the created electric field is limited to the size and position of the electrodes with respect to the tissue.

SUMMARY

The present invention advantageously provides a molding device with electrically conductive material for creating a catheter balloon with electrically conductive elements, and methods and systems for manufacturing same. Additionally, techniques in this disclosure generally relate to pulsed electric field ablation. In one embodiment, a method of coupling a plurality of conductive elements to an expandable element comprises: placing a first portion of a mold proximate a second portion of the mold to define a casting cavity therebetween; depositing a conductive material into the casting cavity; inserting a polymeric material into the casting cavity; securing the first portion of the mold to the second portion of the mold; and expanding the polymeric material to place the polymeric material in contact with the conductive material.

In one aspect of the embodiment, the method further comprises stamping the conductive material into the casting cavity.

In one aspect of the embodiment, the conductive material may include a conductive material and a nonconductive material.

In one aspect of the embodiment, the conductive and the nonconductive materials are arranged in a plurality of layers to define a circuit.

In one aspect of the embodiment, the first portion and the second portion each include a semi-spherical wall defining the casting cavity.

In one aspect of the embodiment, at least a portion of the wall is coated with the electrically conductive material.

In one aspect of the embodiment, the polymeric material includes at least one of a group consisting of a thermoplastic polyurethane, a thermoplastic elastomer, a polyamide, an ethylene vinyl acetate, a polyvinylidene fluoride, and a polyvinyl chloride.

In one aspect of the embodiment, the conductive material is nitinol.

In another embodiment, a molding device comprises a mold including a first portion and a second portion defining a casting cavity therebetween, the first portion and the second portion each including an electrically conductive material disposed thereon.

In one aspect of the embodiment, the mold defines a plurality of indentations, the electrically conductive material being secured within each of the plurality of indentations.

In one aspect of the embodiment, the mold includes a securing mechanism coupling the electrically conductive material within the plurality of indentations.

In one aspect of the embodiment, the securing mechanism includes at least one of a group consisting of an adhesive, a lock, a conductive paste, a collodion, and a hardening cream.

In one aspect of the embodiment, the first portion and the second portion each include a semi-spherical wall, the semi-spherical wall of the first portion and the semi-spherical wall of the second portion together defining the casting cavity, the electrically conductive material being disposed on the semi-spherical wall of each of the first portion and the second portion.

In one aspect of the embodiment, the electrically conductive material surrounds at least a portion of the casting cavity.

In one aspect of the embodiment, the electrically conductive material is printed onto at least a portion of the first portion and the second portion of the mold.

In one aspect of the embodiment, the electrically conductive material is deposited onto at least a portion of the first portion and the second portion of the mold.

In one aspect of the embodiment, the electrically conductive material includes a conductive material and a nonconductive material.

In one aspect of the embodiment, the electrically conductive material is arranged in a plurality of layers to define a circuit.

In one aspect of the embodiment, the electrically conductive material is nitinol.

In yet another embodiment, a method of coupling a plurality of conductive elements to an expandable element comprises: printing an electrically conductive material into a pattern of an object to be cast in a casting cavity of a mold, the mold including a first portion and a second portion proximate the first portion, the first portion and the second portion together defining the casting cavity therebetween; inserting a polymeric material into the casting cavity; securing the first mold portion to the second mold portion; and expanding the polymeric material within the casting cavity thereby coupling the polymeric material with the electrically conductive material.

In yet another embodiment, the present disclosure provides a medical device including an elongated shaft having a proximal portion and a distal portion. A plurality of active electrodes are coupled to the distal portion of the shaft and are configured to electrically couple to a source of pulsed electric field energy. At least one passive electrode is coupled to the shaft and not configured to electrically couple to the source of pulsed electric field energy, the at least one passive electrode being configured to passively extend or focus an electric field generated by the plurality of active electrodes.

In one aspect of this embodiment, the at least one passive electrode is axially aligned with the plurality of active electrodes.

In one aspect of this embodiment, the at least one passive electrode is a guidewire slidably received within a portion of the elongated shaft and extending distally from the distal end of the shaft.

In one aspect of this embodiment, the at least one passive electrode is a helical wire extending from a distal end of the distal portion of the shaft.

In one aspect of this embodiment, each of the plurality of active portions is separated by an insulator disposed on the elongated shaft, and wherein the at least one passive electrode is disposed on the insulator.

In one aspect of this embodiment, at least one of the plurality of active electrodes is composed of tantalum or a tantalum alloy.

In one aspect of this embodiment, the plurality of active electrodes includes at least a portion of the surface having a al layer of oxide.

In one aspect of this embodiment, the plurality of active electrodes is disposed between a pair of the at least one passive electrodes.

In one aspect of this embodiment, the at least one passive electrode is composed of a conductive polymer.

In one aspect of this embodiment, the distal portion includes a balloon, the balloon having an inner surface and an outer surface opposite the inner surface and wherein the plurality of active electrodes and the at least one passive electrode are disposed on the outer surface of the balloon.

In yet another embodiment, a medical system includes a generator configured to generate pulsed electric field (PEF) energy. A medical device is coupled to the generator, the medical device includes an elongated shaft having a proximal portion and a distal portion. A plurality of active electrodes coupled to the distal portion of the shaft and being configured to electrically couple to a source of pulsed electric field energy. At least one passive electrode is coupled to the shaft and not configured to electrically couple to the source of pulsed electric field energy, the at least one passive electrode being configured to passively extend or focus an electric field generated by the plurality of active electrodes.

In one aspect of this embodiment, the at least one passive electrode is axially aligned with the plurality of active electrodes.

In one aspect of this embodiment, the at least one passive electrode is a guidewire slidably received within a portion of the elongated shaft and extending distally from the distal end of the shaft.

In one aspect of this embodiment, the at least one passive electrode is a helical wire extending from a distal end of the distal portion.

In one aspect of this embodiment, each of the plurality of active portions is separated by an insulator disposed on the elongated shaft, and wherein the at least one passive electrode is disposed on the insulator.

In one aspect of this embodiment, the plurality of active electrodes is composed of tantalum or a tantalum alloy.

In one aspect of this embodiment, the plurality of active electrodes includes at least a partial layer of oxide.

In one aspect of this embodiment, the at least one passive electrode is composed of a conductive polymer.

In one aspect of this embodiment, the plurality of active electrodes is disposed between a pair of the at least one passive electrodes.

In yet another embodiment, the medical device includes an elongated shaft having a proximal portion and a distal portion. A plurality of active electrodes coupled to the distal portion of the shaft and being configured to electrically couple to a source of pulsed electric field energy. The plurality of electrodes are composed of tantalum or a tantalum alloy. An insulator disposed between adjacent ones of the plurality of active electrodes, the insulator being composed of tantalum oxide. A plurality of passive electrodes coupled to the shaft and not configured to electrically couple to the source of pulsed electric field energy, the plurality of passive electrodes being configured to passively extend or focus an electric field generated by the plurality of active electrodes. One of the plurality of passive electrodes being disposed on an outer surface of the insulator.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to applying conductive material to a catheter balloon. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first," "second," "top," and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

The devices, systems, and methods described herein may be used for coupling conductive elements, such as electrodes and conductive materials, to a medical device. In one embodiment, the devices, systems, and methods described herein may be used to couple conductive elements to an expandable element, such as a balloon. A balloon 9 with conductive elements may be used to, for example, treat and/or ablate tissue, record electrical signals from myocardial and other tissues, evaluate balloon-tissue contact, and/or navigate safely through the patient's vasculature. In one embodiment, a medical device includes a treatment element, such as a balloon 9, with conductive material 12, such electrodes, sensors, or other electrically and/or thermally conductive elements. Non-limiting examples of such medical device are shown in FIGS. 2-7. The balloon 9, with conductive material 12, may be used for recording data from tissue (such as mapping signals, temperature, impedance, and other signals) ablation of tissue, and cryogenic ablation of tissue and may be coupled with a control unit that is configured for use with any of a variety of energy modalities such as cryogenic, laser, or radiofrequency energy.

Figure 1:
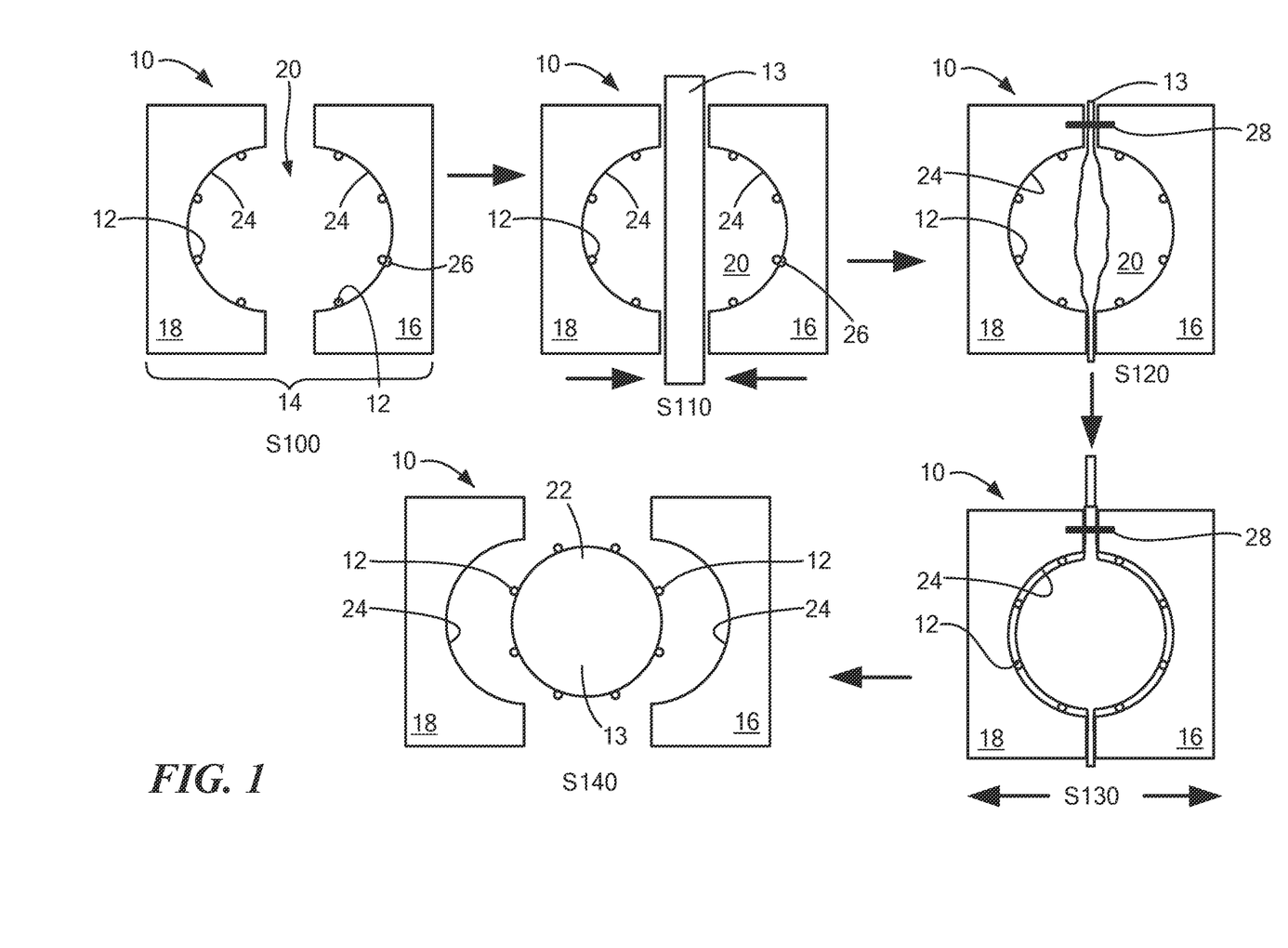
FIG. 1 is an exemplary method for forming a balloon for use with a medical device with conductive elements in accordance with the principles of the present invention.
Figure 2:
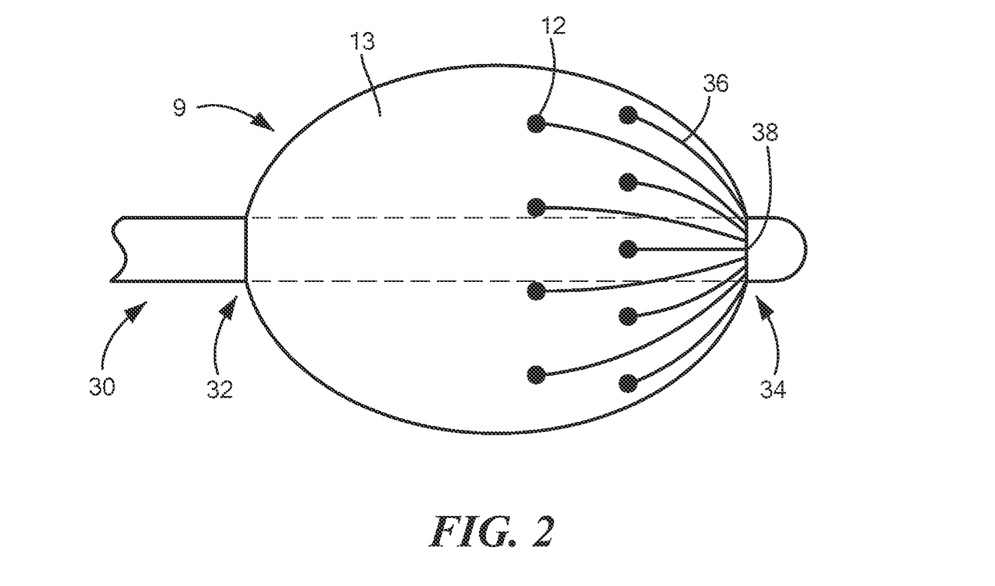
FIG. 2 is a first exemplary medical device including a balloon with conductive elements.
Figure 3:
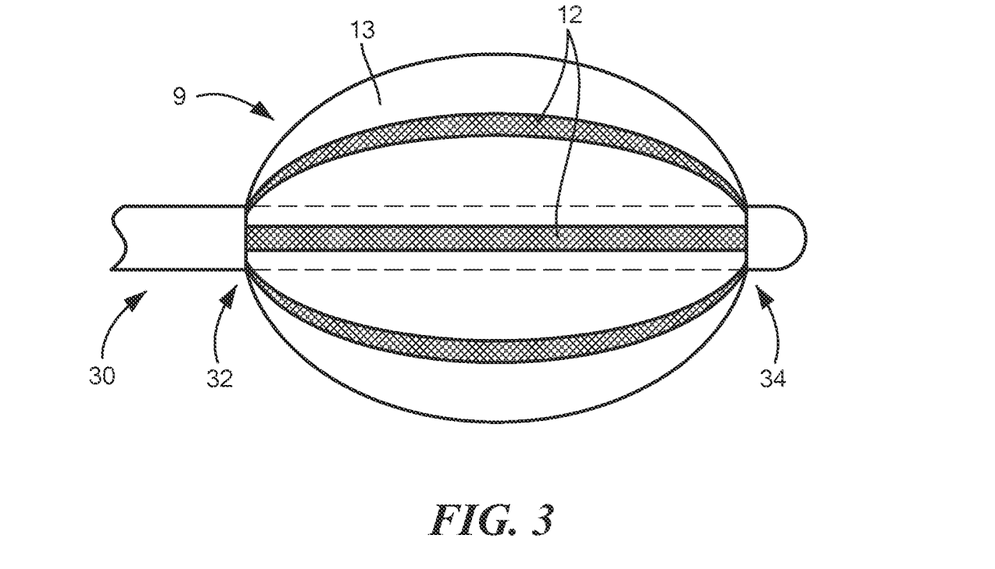
FIG. 3 is a second exemplary medical device including a balloon with conductive elements.
Figure 4:
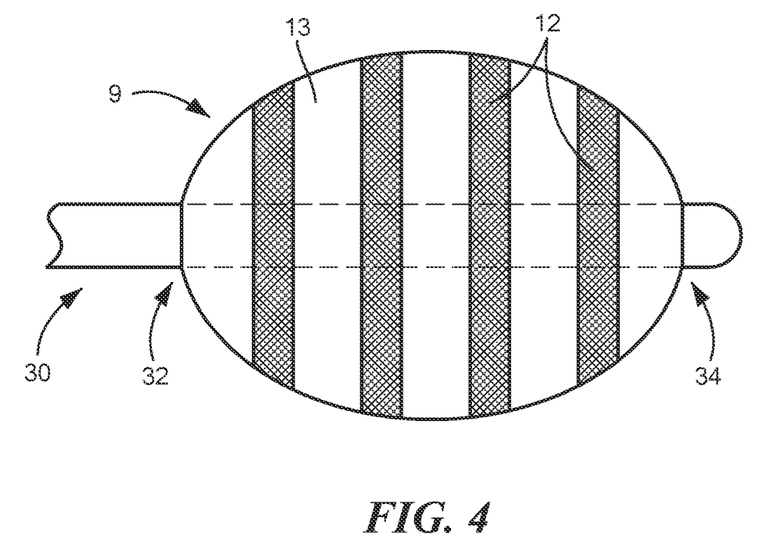
FIG. 4 is a third exemplary medical device including a balloon with conductive elements.
Figure 5:
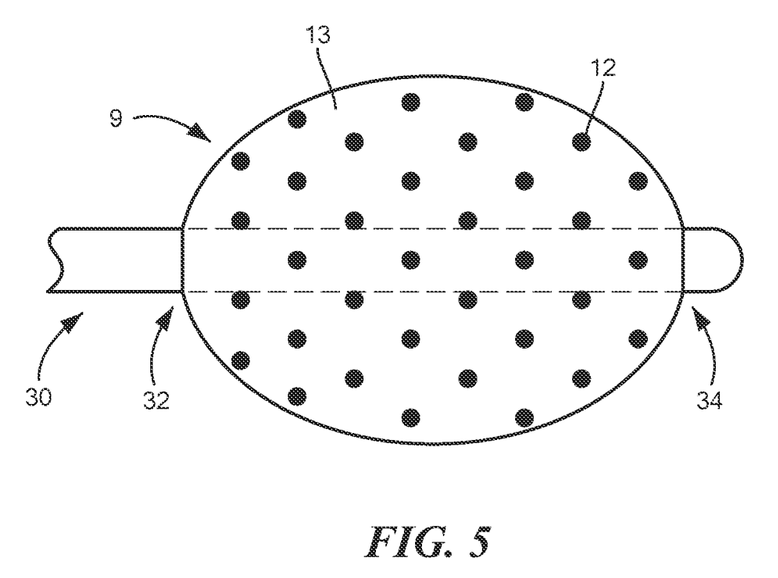
FIG. 5 is a fourth exemplary medical device including a balloon with conductive elements.
Figure 6:
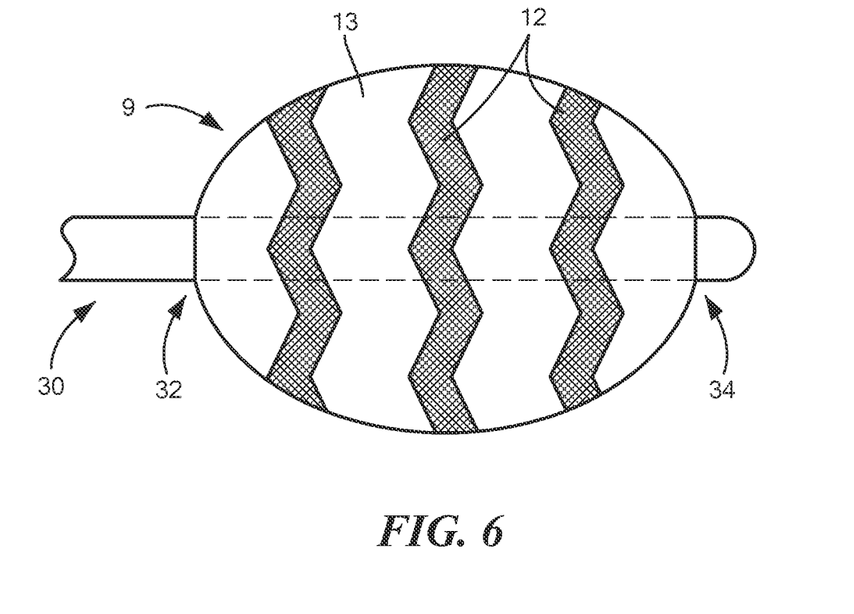
FIG. 6 is a fifth exemplary medical device including a balloon with conductive elements.
Figure 7:
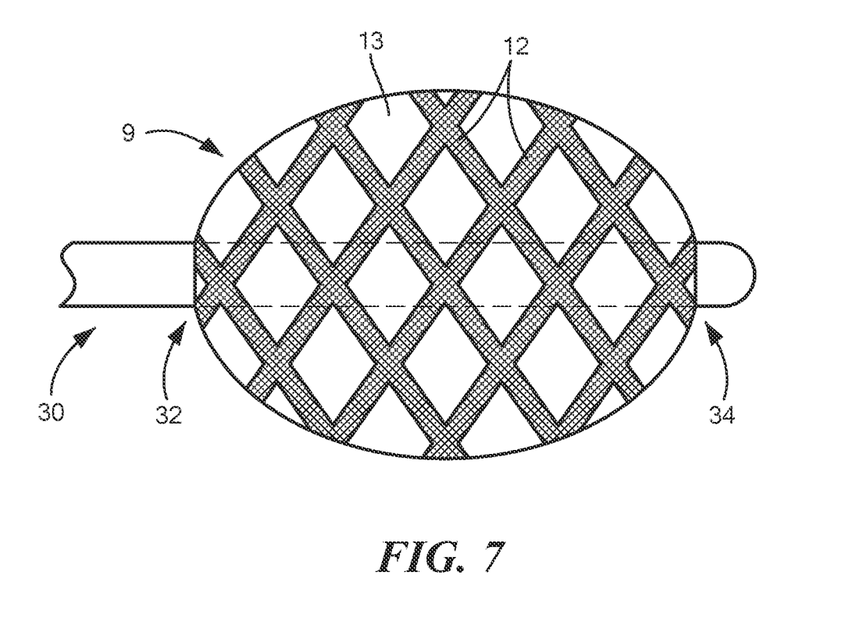
FIG. 7 is a sixth exemplary medical device including a balloon with conductive elements.

Now referring to FIG. 1, an exemplary method for forming a balloon 10 constructed in accordance with the principles of the present invention is shown, where a conductive material 12 may be in contact with polymeric material 13 as shown as S100-S140 in the figure. The polymeric material 13 with conductive material 12 (for example, electrically conductive material or thermally conductive material) may be manufactured or formed using a molding process. As shown in S100, a mold 14 may be used that has a first mold portion 16 and a second mold portion 18. The first mold portion 16 and the second mold portion 18 may be symmetrical or asymmetrical in shape and may be disposed, coupled, or secured together. The first mold portion 16 and the second mold portion 18 may have a three-dimensional shape and together create a casting cavity 20. Alternatively, the mold 14 may have any number of parts and may be made up of a single piece or more than two pieces.

The casting cavity 20 may be defined by a wall 24. The wall 24 of the casting cavity 20 may be any shape and size, including the shape of a half-circle, a half-square, a half-rectangle, and a half-oval. The casting cavity 20 may be symmetrical in shape or asymmetrical. As a non-limiting example, the casting cavity 20 may have a circular shape if it is intended that the polymeric material 13 that is used within the casting cavity 20 also will have a circular shape when inflated. Alternatively, the casting cavity 20 may have an irregular shape if the polymeric material 13 is to be inflated into an irregular shape. Thus, the determination of the size and shape of the casting cavity 20 may depend upon how and where the polymeric material 13 is going to be used. When the first mold portion 16 and the second mold portion 18 are placed proximate to one another, there may be a casting cavity 20 between them. In an exemplary embodiment, the first mold portion 16 and the second mold portion 18 may have a generally rectangular or square shape and the wall 24 of the casting cavity 20 may be different shapes and sizes, including a half-circle or a semi-circle. S100. If the first mold portion 16 and the second mold portion 18 include a semi-spherical wall which define the casting cavity 20, when the first mold portion 16 is placed proximate to the second mold portion 18 there is a casting cavity 20 between them which is the shape of a circle.

The conductive material 12 may be deposited into the wall 24 the casting cavity 20. Alternatively, the conductive material 12 may be sealed, coated, or printed onto the wall 24 of the casting cavity 20. The conductive material 12 may be deposited, coated, sealed, and/or printed onto only a portion of the wall 24 of the casting cavity 20 or on the entire wall 24 of the casting cavity 20. In one embodiment, the wall 24 includes as least one indentation 26, and the conductive material 12 may be deposited, secured, sealed, coated, printed and/or placed within the indentation(s) 26. The indentation(s) 26 may be a variety of different sizes and shapes depending upon how much conductive material 12 is to be deposited, secured, sealed, coated, printed and/or placed within the indentation 26. Generally, the amount of conductive material 12 and placement will depend upon how much is to be deposited onto the polymeric material 13. The conductive material 12 may include nitinol, gold, platinum, copper, or another biocompatible electrically conductive material 12.

As is discussed in more detail below, the conductive material 12 may be a preformed circuit, such as a circuit of stamped metal, a flexible and/or stretchable circuit, and/or any other circuit that is sized and configured to be placed into the casting cavity 20 and insert molded into a balloon 9. Additionally or alternatively, the conductive material may be inserted or deposited directly onto at least a portion of the mold 14 in the desired configuration or pattern.

The polymeric material 13 may be a natural or synthetic polymer and may include a thermoplastic polyurethane, a thermoplastic elastomer, a polyamide, an ethylene vinyl acetate, a polyvinylidene fluoride, and a polyvinyl chloride. The polymeric material 13 may be able to withstand being heated and cooled and may be able to be reformed multiple times. Additionally, if the polymeric material 13 may be able to withstand being expanded and contracted multiple times. The polymeric material 13 may serve as a thermal and electrical insulator, be light-weight, and have a significant degree of strength so that it can ultimately be used as a medical device balloon 9.

When the conductive material 12 is coated, deposited, sealed, or printed onto the wall 24 of the casting cavity 20 in the first mold portion 16 and the second mold portion 18 in different patterns and in varying amounts, the conductive material 12 may include conductive material as well as nonconductive material, even though the mixture as a whole is referred to as a conductive material 12. This conductive and nonconductive material may be arranged in various layers to define a circuit, including a flexible circuit or any other circuit. These layers of conductive and nonconductive material may insulate the conductive material 12 from one another. Also, various parts of the catheter, including an energy source such as an RF energy source, may be coupled with the conductive material 12 and may require additional insulation to allow tissue to be ablated or cryoablated with the conductive material 12. The conductive material 12 may be flexible so that it can be inserted into a portion of the casting cavity 20 as well as when it is deposited onto the polymeric material 13.

The polymeric material 13 may be inserted between the first mold portion 16 and the second mold portion 18 while they are separated from one another into the casting cavity 20. S110. When the polymeric material 13 is placed within the casting cavity 20, all of the polymeric material 13 may be inside the casting cavity 20 or a portion of the polymeric material 13 may be outside the first mold portion 16 and the second mold portion 18. The polymeric material 13 may extend above and below the first mold portion 16 and the second mold portion 18 which would allow access to a portion of the polymeric material 13 while a portion of the polymeric material 13 is inside the casting cavity 20.

As a second step, the first mold portion 16 and the second mold portion 18 may be secured to or coupled with one another with at least a portion of the polymeric material 13 within the casting cavity 20. S120. The securing mechanism 28 may include an adhesive, a lock, a conductive paste, a collodion, a hardening cream, nuts and bolts, screws and tapered holds, threaded components, wires, or any other securing mechanism.

As a third step, a solid, liquid or gas may be inserted into the polymeric material 13 to expand it to a desired shape and size. S130. A straw or other device may be inserted into the polymeric material 13 to expand it to the desired size and shape while the polymeric material 13 is inside the casting cavity 20. In one exemplary embodiment, the polymeric material 13 may be expanded into a circular or oval shape to fill the entire casting cavity 20 such that the polymeric material 13 comes into contact with the conductive material 12. When the polymeric material 13 is expanded to the desired size and shape within the first mold portion 16 and the second mold portion 18, the conductive material 12 may come into contact with polymeric material 13 and be deposited onto or otherwise adhered to the surface of the polymeric material 13 or it may be integrated within the polymeric material 13. This depositing, adhering, or integration may occur when the polymeric material 13 is expanded as the polymeric material 13 may come into contact with the conductive material 12 based upon the surface contact when the polymeric material 13 is expanded to a certain size. Alternatively, the polymeric material 13 and/or the conductive material 12 may be heated to help the conductive material 12 adhere to the polymeric material 13. Chemical treatments may also be applied to the polymeric material 13 and/or the conductive material 12 to help adhere the two to one another.

As a fourth step, the first mold portion 16 may be separated from the second mold portion 18 and the conductive material 12 that has been deposited into the polymeric material 13 may no longer be integrated into the casting cavity 20 of the first mold portion 16 and the second mold portion 18. S140. Depending upon the securing mechanism 28 used to secure the first mold portion 16 to the second mold portion 18, a releasing mechanism may be used to separate them. The pattern of the conductive material 12 on the polymeric material after it has been deposited into the polymeric material 13 may depend upon how it was deposited into wall 24 of the first mold portion 16 and the second mold portion 18.

FIGS. 2-7 provide non-limiting examples of conductive material 12 coupled with polymeric material 13 in a variety of different shapes and patterns of as part of a portion of a catheter 30. The polymeric material 13 may be a balloon 9 and may be secured to the distal end 32 of an elongated shaft 34 of a portion of a catheter 30. When the conductive material 12 is coated, deposited, or printed onto the first mold portion 16 and the second mold portion 18, a desired shape and pattern can be created. In one embodiment, the conductive material 12 may include a plurality of electrodes which may be on the surface or integrated/embedded within the polymeric material 13. Incorporating the conductive material 12 into the polymeric material 13 using the first mold portion 16 and the second mold portion 18 may prevent the conductive material 12 from flaking off the polymeric material 13. As shown as a non-limiting example in FIG. 2, the conductive material 12 may be an electrode and the electrode may be coupled with wires 36 and a multiplexer 38 to combine the signals from the different wires 36 into one signal over a shared medium.

FIGS. 2-7 show non-limiting examples of how the conductive material 12 can be coupled with the polymeric material 13 to create a balloon 9. The method as shown in FIG. 1, S100-S140 may be used to create a balloon 9 with these different patterns based upon what conductive material 12 is used and how the conductive material 12 is deposited within the casting cavity 20 of the first mold portion 16 and the second mold portion 18. A variety of different configurations of conductive material 12 on polymeric material 13 can be created using the first mold portion 16 and the second mold portion 18.

Figure 8:
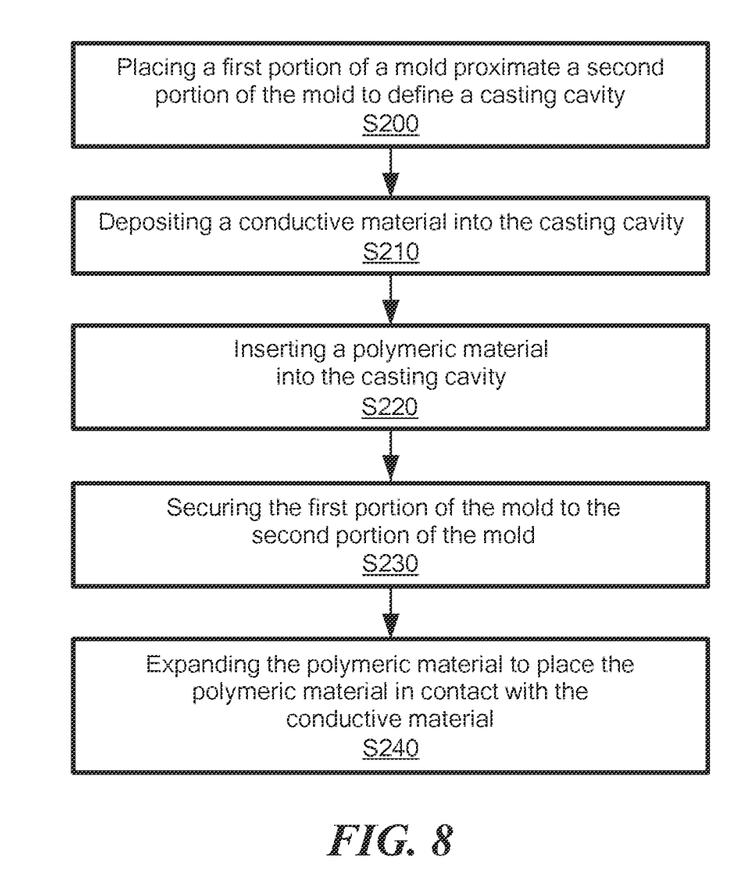
FIG. 8 is a flow chart showing a first exemplary method of coupling electrically conductive elements to a balloon.

Now referring to FIG. 8, the conductive material 12 may be coupled with a polymeric material 13, including a balloon 9 using a molding method. The first mold portion 16 may be placed proximate to the second mold portion 18 to define a casting cavity 20. S200. Conductive material 12 may be deposited into the casting cavity 20. S210. The polymeric material 13 may be inserted into the casting cavity 20. S220. The first mold portion 16 may be secured to the second mold portion 18. S230. The polymeric material 13 may be expanded to place the polymeric material 13 in contact with the conductive material 12. S240.

Figure 9:
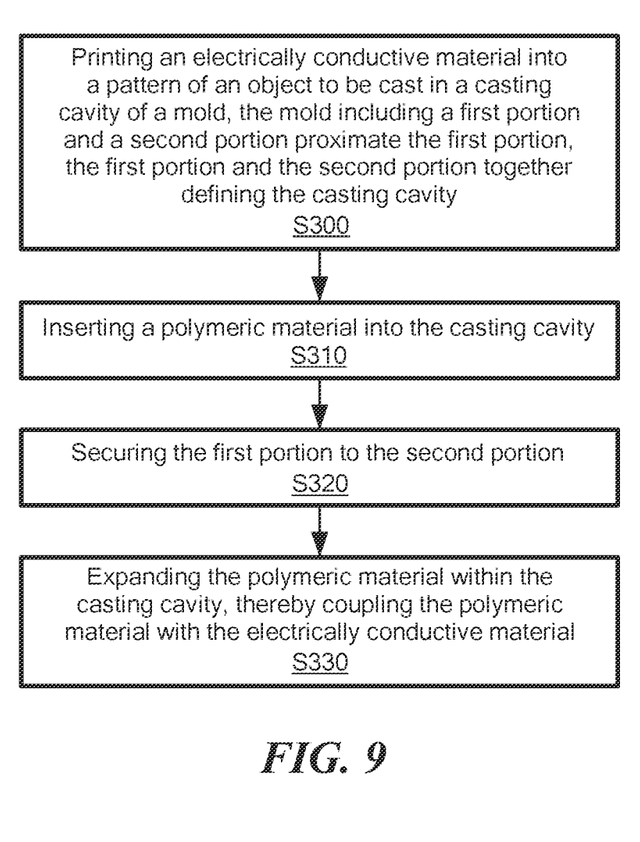
FIG. 9 is a flow chart showing a second exemplary method of coupling electrically conductive elements to a balloon.

Now referring to FIG. 9, the molding may occur where conductive material 12 may be printed into a pattern of an object to be cast on a casting cavity 20 of a mold 14. The mold 14 may include a first mold portion 16 and a second mold portion 18 proximate the first mold portion 16. The first mold portion 16 and the second mold portion 18 together may define the casting cavity 20. S300. The polymeric material 13 may be inserted into the casting cavity 20. S310. The first mold portion 16 may be secured to the second mold portion 18. S320. The polymeric material 13 may be expanded within the casting cavity 20 thereby coupling the polymeric material 13 with the electrically conductive material 12. S330.

The methods described may be used to deposit conductive 12 and non-conductive material onto a variety of different surfaces to create, for example a medical device 40. The medical device 40 may include the balloon 9 with conductive elements, but may also have conductive and non-conductive elements as well to create the medical device 40. For example, the medical device 40, may include the balloon 9 and the balloon may have conductive and non-conductive elements to treat and/or ablate tissue, record electrical signals from myocardial and other tissues, evaluate balloon tissue-contact, and/or navigate through the patient's vasculature. Now referring to FIG. 10, a system 42 generally includes a medical device 40 that may be coupled directly to an energy supply, for example, a pulse field ablation generator 44 configured to generate and deliver various modalities of energy. The pulse field ablation generator 44 may further be coupled directly or indirectly to a catheter electrode distribution system 46 configured to deliver the generated energy to the medical device 40. A remote controller 48 may further be included in communication with the generator 44, the remote controller 48 includes processing circuitry 49 configured to operate and control the various functions of the generator 44 and in further communication with a plurality of surface electrodes 50 configured to measure and record electrograms. Alternatively, the remote controller 48 may be integrated within the generator 44. The medical device 40 may generally include one or more diagnostic or treatment regions for energetic, therapeutic and/or investigatory interaction between the medical device 40 and a treatment site. The treatment region(s) may deliver, for example, pulsed electric field (PEF) energy sufficient to reversibly or irreversibly electroporate a tissue area, or radiofrequency energy in proximity to the treatment region(s).

Figure 10:
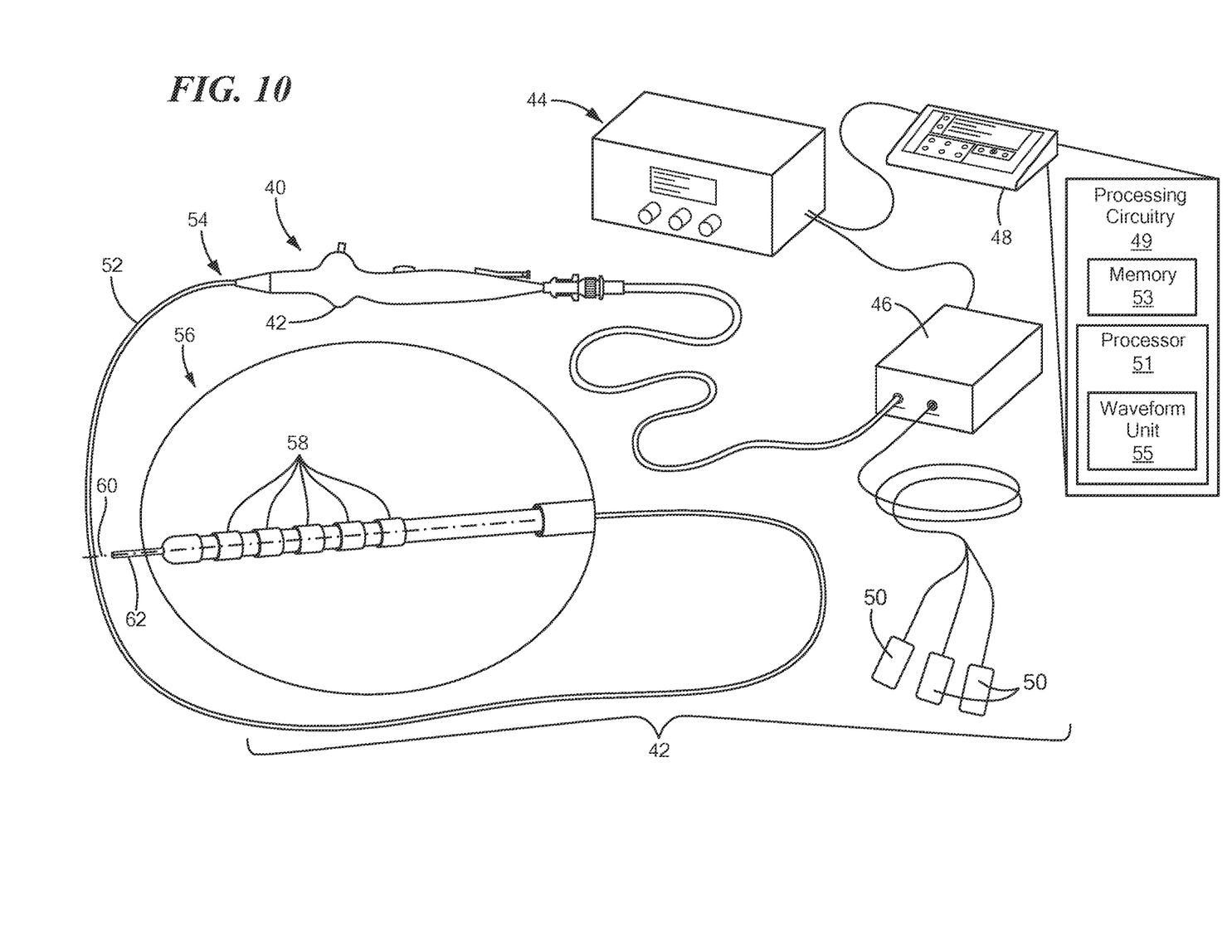
FIG. 10 is a system view of an exemplary pulsed electric field energy delivery system constructed in accordance with the principles of the present application.

In one or more embodiments, the processing circuitry 49 may include a processor 51 and a memory 53. In particular, in addition to or instead of a processor, such as a central processing unit, and memory, the processing circuitry 49 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 51 may be configured to access (e.g., write to and/or read from) the memory 53, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The processing circuitry 49 may be configured to control any of the methods and/or processes described herein and/or to cause such methods, and/or processes to be performed, e.g., by the remote controller 48. Processor 51 corresponds to one or more processors 51 for performing functions described herein. The memory 53 is configured to store data, programmatic software code and/or other information described herein. In some embodiments, the software may include instructions that, when executed by the processor 51 and/or processing circuitry 49 causes the processor 51 and/or processing circuitry 49 to perform the processes described herein with respect to remote controller 48. For example, processing circuitry 49 of the remote controller 48 may include waveform unit 55 that is configured to perform one or more functions described herein such as with respect to pulse generation and control.

The medical device 40 may include an elongate body or catheter 52 passable through a patient's vasculature and/or positionable proximate to a tissue region for diagnosis or treatment, such as a catheter, sheath, or intravascular introducer. The elongate body, shaft, or catheter 52 may define a proximal portion 54 and a distal portion 56, and may further include one or more lumens disposed within the elongate body 52 thereby providing mechanical, electrical, and/or fluid communication between the proximal portion of the elongate body 52 and the distal portion of the elongate body 52. The distal portion 56 may generally define the one or more treatment region(s) of the medical device 40 that are operable to monitor, diagnose, and/or treat a portion of a patient. The treatment region(s) may have a variety of configurations to facilitate such operation. The catheter 30, as shown in the embodiments in FIGS. 2-7, may be on the distal portion 56 of the catheter 52 as shown in FIG. 10. The distal portion 56 of the catheter 52 may include the catheter 30 and any of the balloons 9 shown in FIGS. 2-7.

In the case of purely bipolar pulsed field delivery, distal portion 56 includes electrodes that form the bipolar configuration for energy delivery. A plurality of active electrodes 58 may deliver in a bipolar fashion between selections of electrodes 58 or serve as one pole while a second device containing one or more electrodes (not pictured) would be placed to serve as the opposing pole of the bipolar configuration. Alternatively, the electrodes 58 may be arranged to deliver unipolar energy deliver between the plurality of electrodes 58 and the plurality of surface electrodes 50. As shown in FIG. 1, the medical device 40 may have a linear configuration with the plurality of active electrodes 58. For example, the distal portion 56 may include six active electrodes 58 linearly disposed along a common longitudinal axis 60. Alternatively, the distal portion 56 may include an electrode carrier arm or splines that is/are transitionable between a linear configuration and an expanded configuration in which the carrier arm or splines has an arcuate or substantially circular configuration. The carrier arm or splines may include the plurality of active electrodes 58 that are configured to deliver pulsed-field energy. Further, the carrier arm when in the expanded configuration may lie in a plane that is substantially orthogonal to the longitudinal axis of the elongate body 52. The planar orientation of the expanded carrier arm may facilitate ease of placement of the plurality of active electrodes 58 in contact with the target tissue. In yet another configuration, the distal portion may include a balloon with a plurality of electrodes 58 disposed on an outer surface of the balloon and configured to deliver pulsed-field energy.

Figure 11:
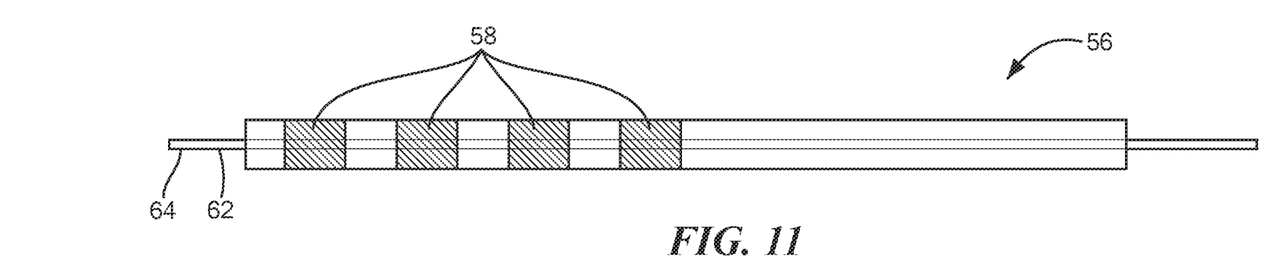
FIG. 11 is a side view of an exemplary distal portion of the medical device used with the system shown in FIG. 10.

Referring now to FIGS. 11-16, in some configurations, at least one passive electrode 62 is coupled, directly or indirectly, or otherwise engaged to the elongate body 52. The at least one passive electrode 62 is a conductive element that is not coupled to a conductor that is coupled to a generator 44. That is, the at least one passive electrode 62 is not independently configured to delivery PEF energy. Rather, the at least one passive electrode 62 is configured to extend or focus PEF energy delivered by the plurality of active electrodes 58 to create particular ablation patterns. For example, as shown in FIG. 11, the at least one passive electrode 62 is a guidewire 64 slidably received within a portion of the elongated body 52 and extends distally from the distal end of the elongate body 52. The distance that the guidewire 64 extends form the distal end of the elongate body 52 changes the electric field. That is, the guidewire 64 extends the PEF generated by the plurality of active electrodes 58 by creating an electrical pathway between the active electrodes 58 and the guidewire 64. More specifically, the higher conductivity of the wire being the passive electrode 62 creates a locally preferential pathway for the electric field causing a focusing of the electric field around the passive electrode 62 in the presence of the PEF energy applied between the active electrodes 58. To convey more intuitively, because there is a more conductive path presented by the passive electrode 62, more field chooses to pass through that space which increases the field intensity around that element. In the configuration shown in FIG. 11, the guidewire 64 is axially aligned with the active electrode 58.

Figure 12:
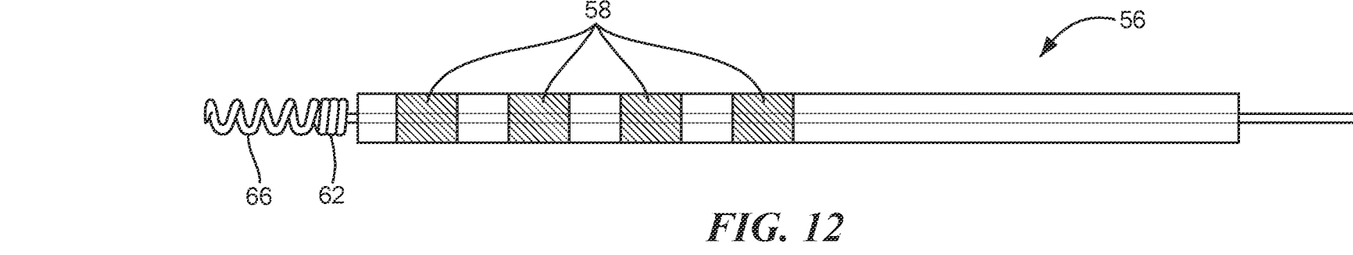
FIG. 12 is side view of another embodiment of an exemplary distal portion of a medical device used with the system shown in FIG. 10.

Referring now to FIG. 12, in another configuration, the at least one passive electrode 62 is a helical conductor 66, such as a wire, extending from the distal end of the elongate body 52. In one configuration, the helical conductor 66 is fixed at the distal end of the elongate body 52. In other configurations, the helical conductor is slidably disposed within a portion of the elongate body 52 and can be advanced and retracted from the distal end of the elongate body 52. The helical shape of the helical conductor 66 allows potential active fixation to the target tissue in addition to a focusing of the applied PEF energy.

Figure 13:
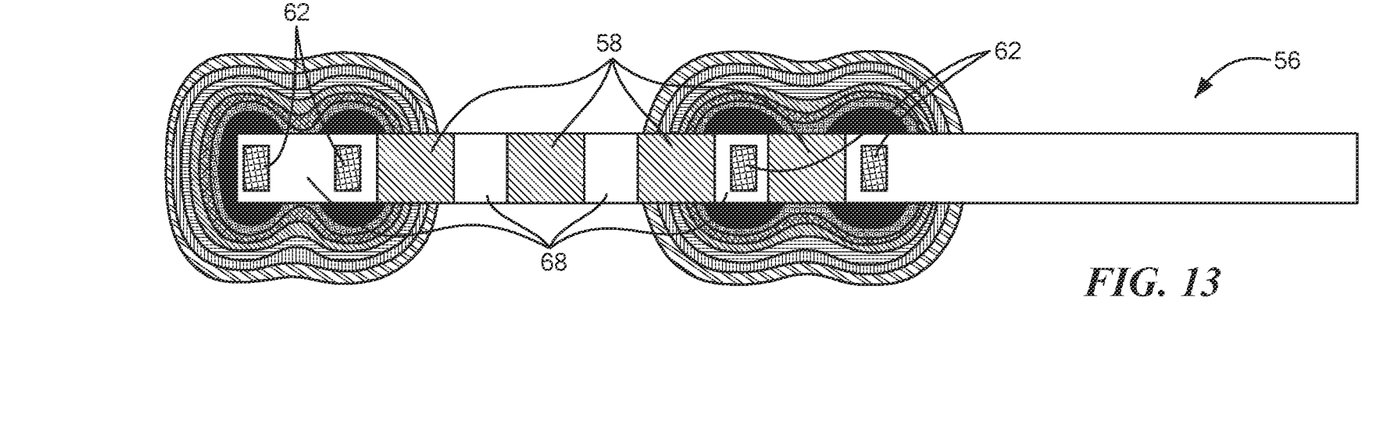
FIG. 13 is side view of another embodiment of an exemplary distal portion of a medical device used with the system shown in FIG. 10 and showing an exemplary electric field generated by one or more passive electrodes.

Referring now to FIG. 13, disposed between the active electrodes 58 may be an insulator 68 disposed about a portion of the elongate body 52. The insulator 68 may be, for example, tantalum pentoxide or other insulating materials that prevent delivery of low voltage pulses but allows high voltage pulses or a polymeric material. The at least one passive electrode 62, which may be a ring electrode or an insulative coating, for example, a coating of tantalum, tantalum oxide, or a conductive polymer, may be disposed on an outer surface of the insulator 68 to create particular ablation patterns. In the configuration shown in FIG. 13, a pair of the least one passive electrode 62 is disposed distal to the most distal active electrode 58 and a pair of the at least one passive electrode 62 is disposed on opposite sides of the most proximal active electrode 58. An exemplary electric field is shown about each of the passive electrodes 62.

Figure 14:
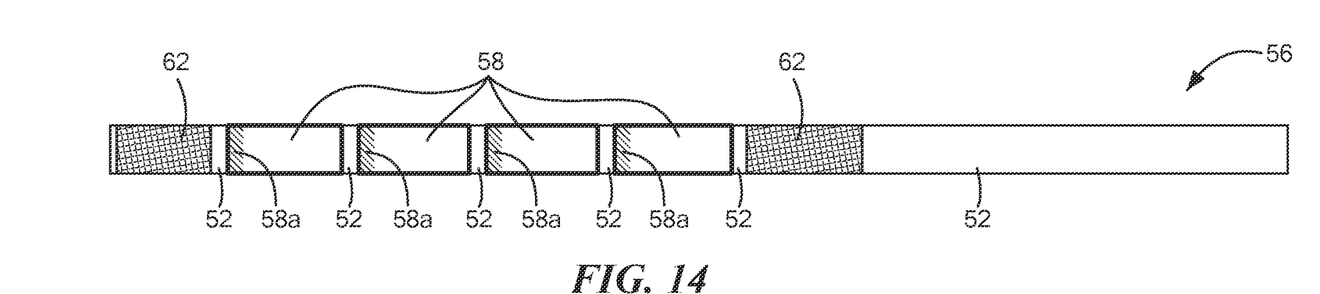
FIG. 14 is side view of another embodiment of an exemplary distal portion of a medical device used with the system shown in FIG. 10.
Figure 15:
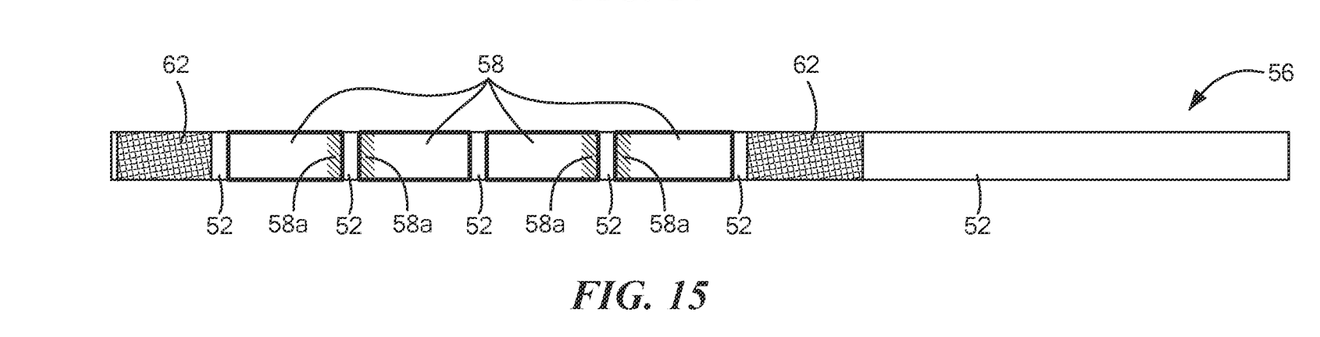
FIG. 15 is side view of another embodiment of an exemplary distal portion of a medical device used with the system shown in FIG. 10.
Figure 16:
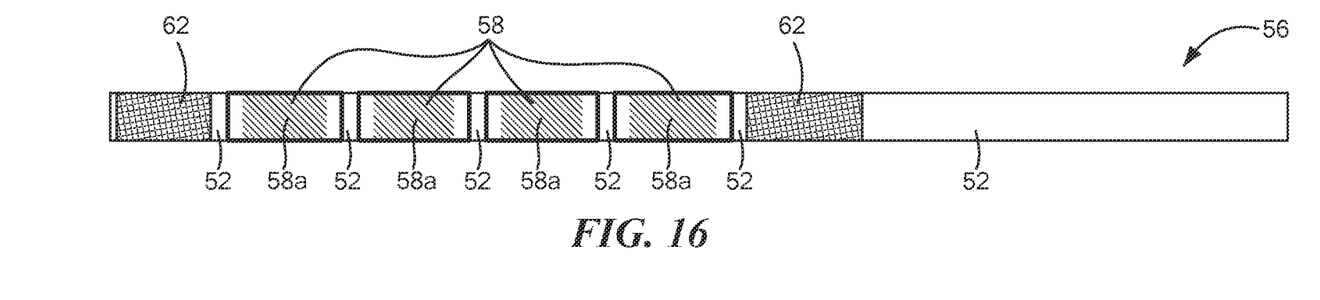
FIG. 16 is side view of another embodiment of an exemplary distal portion of a medical device used with the system shown in FIG. 10.

Referring now to FIG. 14 in another configuration, the active electrodes 58 are composed of tantalum or a tantalum alloy and are substantially coated, anodized, or otherwise layered with tantalum oxide, i.e. pentoxide as labeled by "58a". For example, in one configuration, about 90% of the surface of the active electrodes 58 are anodized or layered with tantalum oxide to reduce far-field electrograms. In such a configuration, the exposed non-anodized regions of the active electrodes 58 may be used for sensing and mapping and the anodized portion will be included for delivery of PEF energy. In this particular configuration, the non-anodized portion of the active electrode 58 is disposed at the distal end of each electrode 58 such that a non-anodized portion of one of the active electrodes 58 is adjacent an anodized portion of an adjacent electrode 58. In the configuration shown in FIG. 14 the active electrodes 58 are disposed between a pair of the at least one passive electrode 62. In the configuration shown in FIG. 15, the exposed portions of adjacent electrodes 58 are positioned adjacent to each other for bipolar sensing. This allows for a more localized measurement of EGM activity for example when targeting cardiomyocytes. In the configuration shown in FIG. 16, the active electrodes 58 are about 90% exposed and only about 10% coated with tantalum oxide. Such a configuration reduces edge effects, i.e., overheating at the edges of the electrodes owing to increased current.

Figure 17:
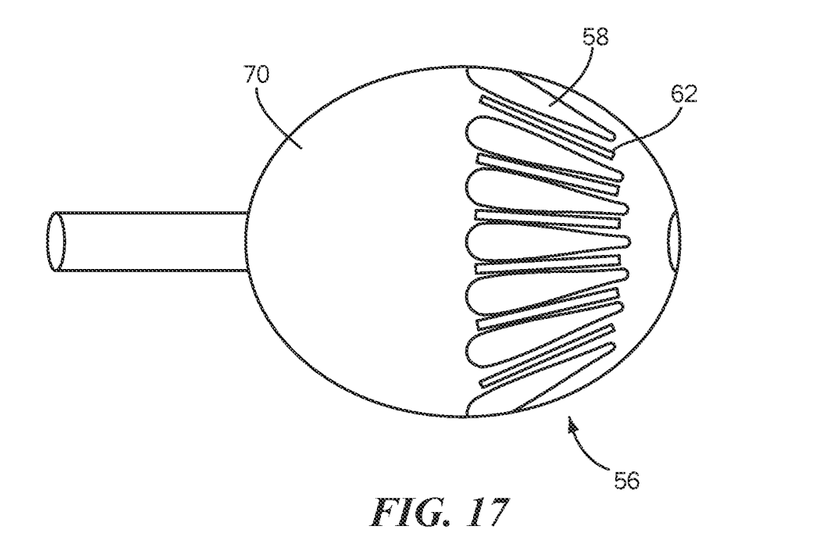
FIG. 17 is side view of another embodiment of an exemplary distal portion of a medical device used with the system shown in FIG. 10 with passive electrodes disposed between active electrodes.
Figure 18:
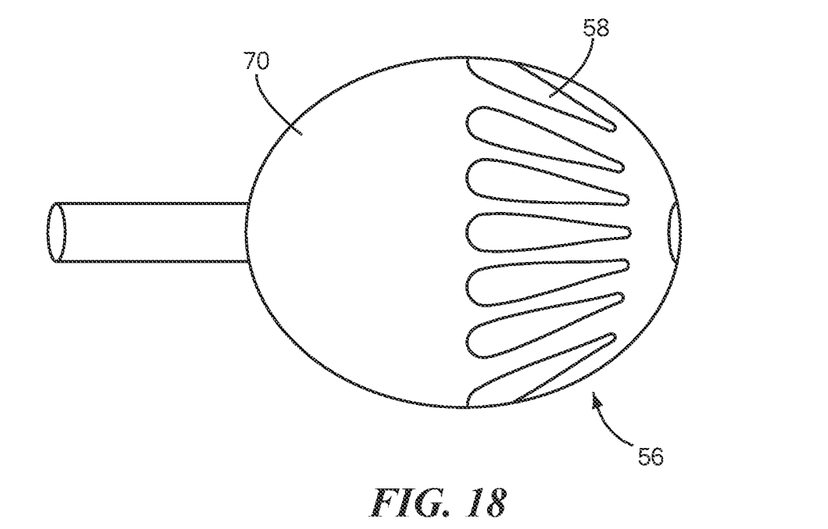
FIG. 18 is side view of another embodiment of an exemplary distal portion of a medical device used with the system shown in FIG. 10 with passive electrodes disposed around a perimeter of active electrodes.

Referring now to FIGS. 17 and 18, disposed at the distal end of the elongate body 52 may be an expandable member 70, for example, the balloon 9. Disposed on the outer surface of the balloon 70 may the active electrodes 58 in any number and in any shape or size. For example, as shown in FIG. 17, the active electrodes 58 define substantially tear-drop shapes. In one configuration, as shown in FIG. 17, the at least one passive electrode 62 is disposed between two adjacent active electrodes 58 or near an active electrode and in FIG. 18, the perimeter of each electrode may be anodized in whole or in part with tantalum oxide to reduce edge effect. As shown in FIGS. 2-7, the conductive material 12 may include active electrodes 58 as well as passive electrodes 62 in a variety of different configurations. It will be understood that the conductive material 12 may be an active electrode 58 or a passive electrode 62 so that different forms and patterns of energy delivery may be achieved in different locations and places on the body.

It will be appreciated by persons skilled in the art that the present embodiments are not limited to what has been particularly shown and described herein above. In addition, unless mention was made above to the contrary, it should be noted that all of the accompanying drawings are not to scale.

What is claimed is:

1. A medical device, comprising:
   an elongated shaft having a proximal portion and a distal portion;
   a plurality of active electrodes coupled to the distal portion of the shaft and being configured to electrically couple to a source of pulsed electric field energy; and
   a guidewire configured as a passive electrode coupled to the shaft and not configured to electrically couple to the source of pulsed electric field energy, the guidewire being configured to passively extend or focus an electric field generated by the plurality of active electrodes, wherein, during use, the guidewire is slidably received within a portion of the elongated shaft and extends distally from the distal end of the shaft.

2. The device of claim 1, wherein the guidewire is axially aligned with the plurality of active electrodes.

3. The device of claim 1, wherein the guidewire is composed of a conductive polymer.

4. A medical system, comprising:
   a generator configured to generate pulsed electric field (PEF) energy; and
   a medical device coupled to the generator, the medical device including:
   an elongated shaft having a proximal portion and a distal portion;
   a plurality of active electrodes coupled to the distal portion of the shaft and being configured to electrically couple to a source of pulsed electric field energy; and
   a guidewire configured as a passive electrode coupled to the shaft and not configured to electrically couple to the source of pulsed electric field energy, the passive electrode being configured to passively extend or focus an electric field generated by the plurality of active electrodes, wherein, during use, the guidewire is slidably received within a portion of the elongated shaft and extends distally from the distal end of the shaft.

5. The system of claim 4, wherein the guidewire is axially aligned with the plurality of active electrodes.

6. The system of claim 4, wherein the guidewire is composed of a conductive polymer.

* * * * *